US010000274B2

(12) United States Patent
Loyet et al.

(10) Patent No.: US 10,000,274 B2
(45) Date of Patent: Jun. 19, 2018

(54) MITIGATION OF SURFACE DISCONTINUITIES BETWEEN FLIGHT CONTROL SURFACES AND AN AIRFRAME OF AN AIRCRAFT

(71) Applicant: The Boeing Company, Chicago, IL (US)

(72) Inventors: Jessica Loyet, St. Louis, MO (US); Dale M. Pitt, Affton, MO (US)

(73) Assignee: The Boeing Company, Chicago, IL (US)

( * ) Notice: Subject to any disclaimer, the term of this patent is extended or adjusted under 35 U.S.C. 154(b) by 60 days.

(21) Appl. No.: 14/831,066

(22) Filed: Aug. 20, 2015

(65) Prior Publication Data
US 2017/0050720 A1    Feb. 23, 2017

(51) Int. Cl.
*B64C 1/00*      (2006.01)
*B64C 9/02*      (2006.01)
*B64C 7/00*      (2006.01)

(52) U.S. Cl.
CPC ............... *B64C 9/02* (2013.01); *B64C 7/00* (2013.01); *Y02T 50/32* (2013.01); *Y02T 50/44* (2013.01)

(58) Field of Classification Search
CPC .. B64C 9/02; B64C 3/187; B64C 3/20; B64C 2003/445; B64C 9/00; B64C 9/16; B64C 9/18; B64C 13/30; B64C 13/00; B64C 5/10; Y02T 50/44; Y02T 50/32
See application file for complete search history.

(56) References Cited

U.S. PATENT DOCUMENTS

| 2,281,696 | A | * | 5/1942 | Johnson | B64C 9/02 |
| | | | | | 244/90 B |
| 4,471,925 | A | * | 9/1984 | Kunz | B64C 9/00 |
| | | | | | 244/130 |
| 4,739,954 | A | * | 4/1988 | Hamilton | B64C 3/26 |
| | | | | | 244/123.1 |
| 5,794,893 | A | * | 8/1998 | Diller | B64C 3/48 |
| | | | | | 244/130 |
| 5,810,291 | A | * | 9/1998 | Geiger | B64C 9/02 |
| | | | | | 16/225 |

(Continued)

FOREIGN PATENT DOCUMENTS

EP      2397403 A2    12/2011

OTHER PUBLICATIONS

Jim Moore, Aircraft Designers Crafting More Bird-like Wings, www.aopa.org/News-and-Video/All-News/2012/October/4, Oct. 4, 2012, entire document.

(Continued)

*Primary Examiner* — Assres H Woldemaryam
(74) *Attorney, Agent, or Firm* — Duft Bornsen & Fettig LLP (57) ABSTRACT

Embodiments provide a transitional element that bridges a gap between an edge of a flight control surface and an edge of a non-movable portion of an airframe. In one embodiment, a transitional element bridges a gap between an edge of a flight control surface and an edge of a non-movable portion of an airframe. The transitional element includes a plurality of ribs that span the gap. Each of the plurality of ribs has a contour that corresponds to the flight control surface and is configured to pivot a portion of a rotated angle of the flight control surface to generate a transitional surface across the gap.

18 Claims, 10 Drawing Sheets

(56) References Cited

U.S. PATENT DOCUMENTS

| | | | | |
|---|---|---|---|---|
| 5,984,230 | A * | 11/1999 | Orazi | B64C 27/473 244/124 |
| 6,145,791 | A * | 11/2000 | Diller | B64C 9/02 244/130 |
| 6,173,924 | B1 | 1/2001 | Young et al. | |
| 6,209,824 | B1 * | 4/2001 | Caton | B64C 7/00 244/213 |
| 6,244,542 | B1 * | 6/2001 | Young | B64C 3/50 244/213 |
| 7,708,231 | B2 * | 5/2010 | Lacy | B64C 9/16 244/211 |
| 8,342,447 | B2 * | 1/2013 | Etling | B64C 7/00 244/215 |
| 8,695,925 | B2 * | 4/2014 | Khorrami | B64C 9/02 244/212 |
| 9,346,533 | B2 * | 5/2016 | Kruse | B64C 3/185 |
| 2002/0100842 | A1 * | 8/2002 | Perez | B64C 3/48 244/219 |
| 2010/0288887 | A1 * | 11/2010 | Parker | B64C 9/02 244/213 |
| 2013/0099063 | A1 * | 4/2013 | Grip | B64D 27/24 244/219 |
| 2013/0261852 | A1 * | 10/2013 | Recksiek | B64C 13/24 701/3 |
| 2013/0277503 | A1 * | 10/2013 | Geders | B64C 3/48 244/213 |
| 2015/0129715 | A1 * | 5/2015 | Madsen | B64C 13/30 244/99.8 |
| 2015/0336658 | A1 * | 11/2015 | Habibvand | B64C 9/16 244/213 |

OTHER PUBLICATIONS

Jim Moore, Shape-shifting Flap Takes Flight, www.aopa.org/News-and-Video/All-News/2014/November/17, Nov. 17, 2014, entire document.

European Search Report; Application 16179678.4-1754; dated Jan. 31, 2017.

* cited by examiner

MITIGATION OF SURFACE DISCONTINUITIES BETWEEN FLIGHT CONTROL SURFACES AND AN AIRFRAME OF AN AIRCRAFT

FIELD

This disclosure relates to the field of aircraft, and in particular, to mitigating the effects of a gap between edges of flight control surfaces and non-movable portions of an airframe of an aircraft.

BACKGROUND

In order for a flight control surface of an aircraft to move relative to the airframe, a gap exists between the flight control surfaces and the airframe. When the flight control surface moves, a discontinuous surface is formed across the gap. This discontinuous surface generates turbulent airflow across the gap and additional noise during flight, both of which are undesirable. The turbulent airflow increases the drag on the aircraft, which reduces the fuel economy. The additional noise generated by the aircraft is also undesirable, since aircraft noise is a common complaint for people living near areas of high air traffic (e.g., near airports or under air travel routes). Therefore, there is a desire to improve the performance of aircraft and/or reduce the noise generated by aircraft by mitigating the discontinuous surfaces generated across gaps between the edges of flight control surfaces and the non-movable portions of the airframe.

SUMMARY

The embodiments provided herein describe a transitional element that spans a gap between an edge of a flight control surface and an edge of a non-movable portion of an airframe of an aircraft utilizing a plurality of movable ribs. The ribs of the transitional element have a contour that corresponds to the flight control surface, and are capable of deflecting or moving as the flight control surface moves. The ribs that are located nearest the edge of the non-movable portion of the airframe deflect less, while ribs that are located nearest the edge of the flight control surface deflect more. This creates a smooth transitional surface across the gap. The embodiments provided herein also describe a method of actuating the transitional element.

One embodiment comprises a transitional element that bridges a gap between an edge of a flight control surface and an edge of a non-movable portion of an airframe. The transitional element includes a plurality of ribs that span the gap. Each of the plurality of ribs has a contour that corresponds to the flight control surface and is configured to pivot a portion of a rotated angle of the flight control surface to generate a transitional surface across the gap.

Another embodiment is a method for actuating a transitional element that bridges a gap between an edge of a flight control surface and an edge of a non-movable portion of an airframe. The transitional element includes a plurality of ribs that span the gap, where each of the plurality of ribs has a contour that corresponds to the flight control surface. The method comprises pivoting a first rib of the plurality of ribs a first portion of a rotated angle of the flight control surface, where the first rib is positioned closer to the edge of the flight control surface than a second rib of the plurality of ribs. The method further comprises pivoting the second rib a second portion of the rotated angle of the flight control surface, where the first portion of the rotated angle is greater than the second portion of the rotated angle. Further, the plurality of ribs generates a transitional surface across the gap.

Another embodiment is an apparatus comprising a transitional element that bridges a gap between an edge of a flight control surface and an edge of a non-movable portion of an airframe. The transitional element includes a plurality of ribs that span the gap, where each of the plurality of ribs has a contour that corresponds to the flight control surface. The apparatus further comprises a means for pivoting a first rib of the plurality of ribs a first portion of a rotated angle of the flight control surface, where the first rib is positioned closer to the edge of the flight control surface than a second rib of the plurality of ribs. The apparatus further comprises a means for pivoting the second rib a second portion of the rotated angle of the flight control surface, where the first portion of the rotated angle of the flight control surface is greater than the second portion of the rotated angle of the flight control surface.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments.

Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
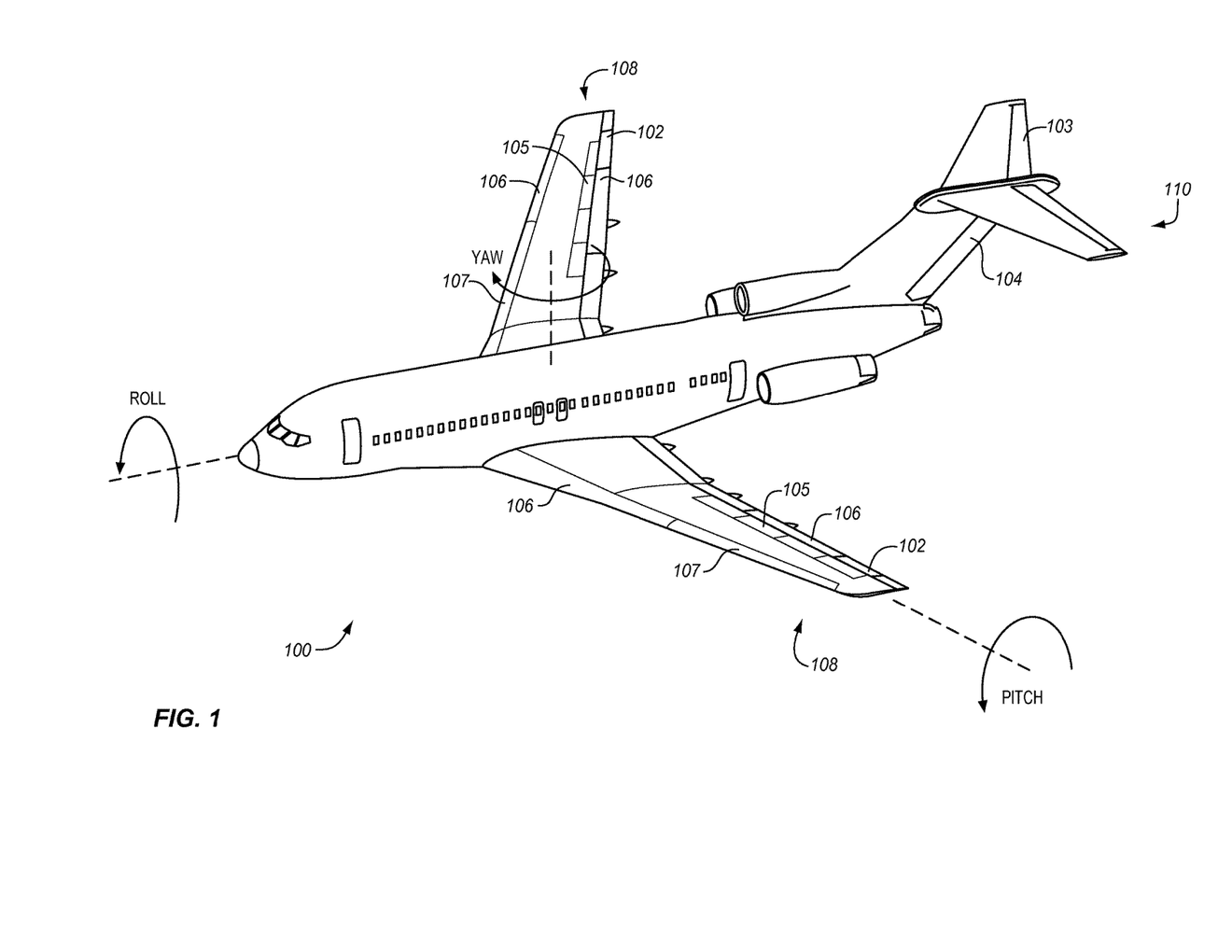
FIG. 1 illustrates an aircraft that includes a number of flight control surfaces in an exemplary embodiment.

FIG. 1 illustrates an aircraft 100 that includes a number of flight control surfaces 102-107 in an exemplary embodiment. Flight control surfaces 102-107 allow a pilot to adjust and control an attitude of aircraft 100 during flight. The particular configuration of flight control surfaces 102-107 illustrated with respect to aircraft 100 is subject to change based on the design and desired flight characteristics of aircraft 100, and therefore, aircraft 100 may include more or fewer flight control surfaces 102-107 in other embodiments.

In this embodiment, flight control surfaces 102-107 include both main flight control surfaces and secondary flight control surfaces. The main flight control surfaces deflect air passing over them as aircraft 100 is in flight. This deflection of air generates unbalanced forces on aircraft 100, and causes aircraft 100 to roll, yaw, and pitch during flight. The main flight control surfaces include ailerons 102, an elevator 103, and a rudder 104. Ailerons 102 are mounted on the trailing edge of each of wing 108, and move in opposite directions. Ailerons 102 are used by the pilot to change the roll of aircraft 100 during flight. Elevator 103 is mounted near a tail 110 of aircraft 100, and is used by the pilot to change the pitch of aircraft 100 during flight. Rudder 104 is also near tail 110, and is used by the pilot to change the yaw of aircraft 100 during flight.

The secondary flight control surfaces include spoilers 105, flaps 106, and slats 107. Spoilers 105 are mounted near the trailing edge of wing 108, and reduce the lift generated by wing 108 by disrupting airflow. A pilot of aircraft 100 may use spoilers 105 to dump lift and allow aircraft 100 to descend without pitching aircraft 100 in a nose-down configuration. This may allow the pilot to descend without increasing the speed of aircraft 100. Flaps 106 are mounted on the trailing edges of wing 108 and/or the leading edge of wing 108, and are used to increase the effective curvature of wing 108. Flaps 106 reduce the stall speed of aircraft 100, and are used during low speed take-off and landing maneuvers. Slats 107 are mounted on the leading edge of wing 108, and are used to reduce the stall speed of aircraft 100 during low speed take-off and landing maneuvers.

Figure 2:
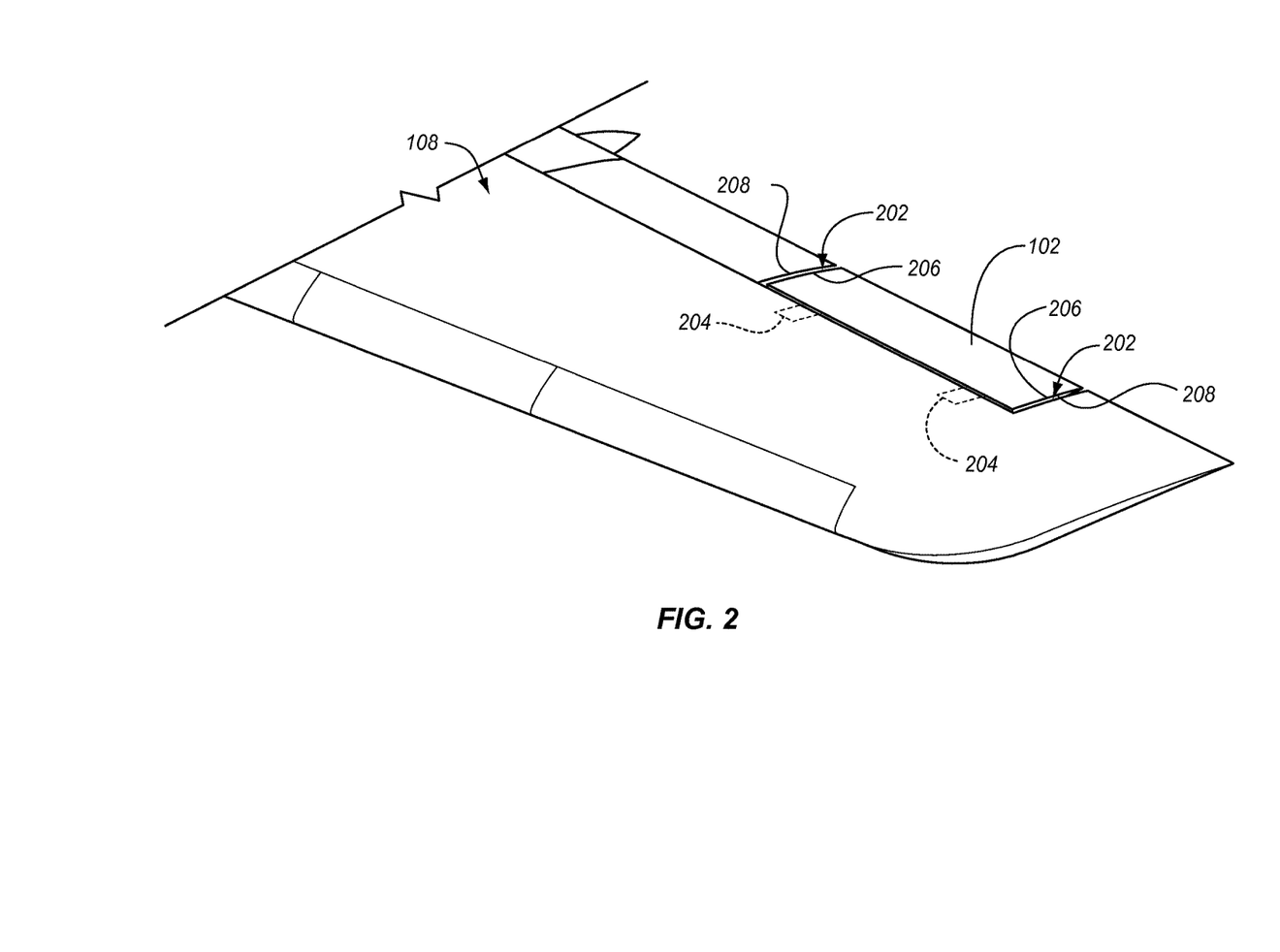
FIG. 2 illustrates a view of a portion of a wing of the aircraft of FIG. 1 in an exemplary embodiment.

FIG. 2 illustrates a view of a portion of wing 108 of aircraft 100 in an exemplary embodiment. In this view, a gap 202 is shown between an edge 206 of aileron 102 and an edge 208 of a non-movable portion of wing 108. Gap 202 allows aileron 102 to deflect, move, rotate, etc., with respect to wing 108 (e.g., utilizing hinges 204 or other devices that rotatably couple aileron 102 to wing 108 along an axis of rotation for aileron). However, gap 202 may generate problems with respect to the airflow over wing 108. When aileron 102 is in a neutral position (e.g., not rotated either up or down with respect to the major surfaces of wing 108, the impact of gap 202 in generating turbulent airflow around aileron 102 is rather small. However, in a deflected or rotated position, a discontinuous surface is formed between wing 108 and aileron 102 across gap 202.

Figure 3:
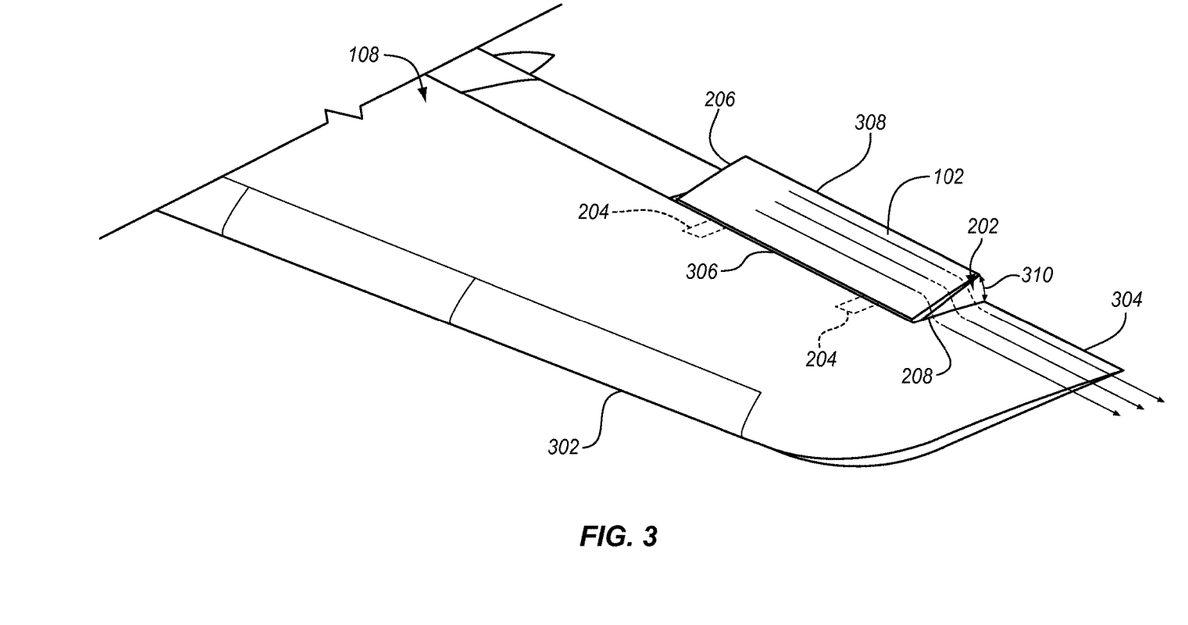
FIG. 3 illustrates an aileron moved upwards by a rotated angle with respect to the wing of FIG. 2 in an exemplary embodiment.

FIG. 3 illustrates aileron 102 moved upwards by a rotated angle 310 with respect to wing 108 in an exemplary embodiment. Aileron 102 includes a leading edge 306, which is surrounded by wing 108, and a trailing edge 308. A number of arrows illustrate how a contour between aileron 102 and wing 108 becomes discontinuous across gap 202. As air flows over wing 108 from a leading edge 302 of wing 108 past a trailing edge 304 of wing 108, air that flows past gap 202 becomes turbulent due to the discontinuous surface that is formed by gap 202. The turbulence increases the drag on wing 108, and increases the noise generated by wing 108. The increased drag will reduce the fuel efficiency of aircraft 100, and typically any increase in noise generated by aircraft 100 is undesirable. A similar discontinuous surface is formed when aileron 102 is rotated into a down position with respect to wing 108. Further, although problems associated with gap 202 have and will be discussed with respect to aileron 102; similar issues arise with gaps that exist between the airframe of aircraft 100 and other flight control surfaces 103-107.

Figure 4:
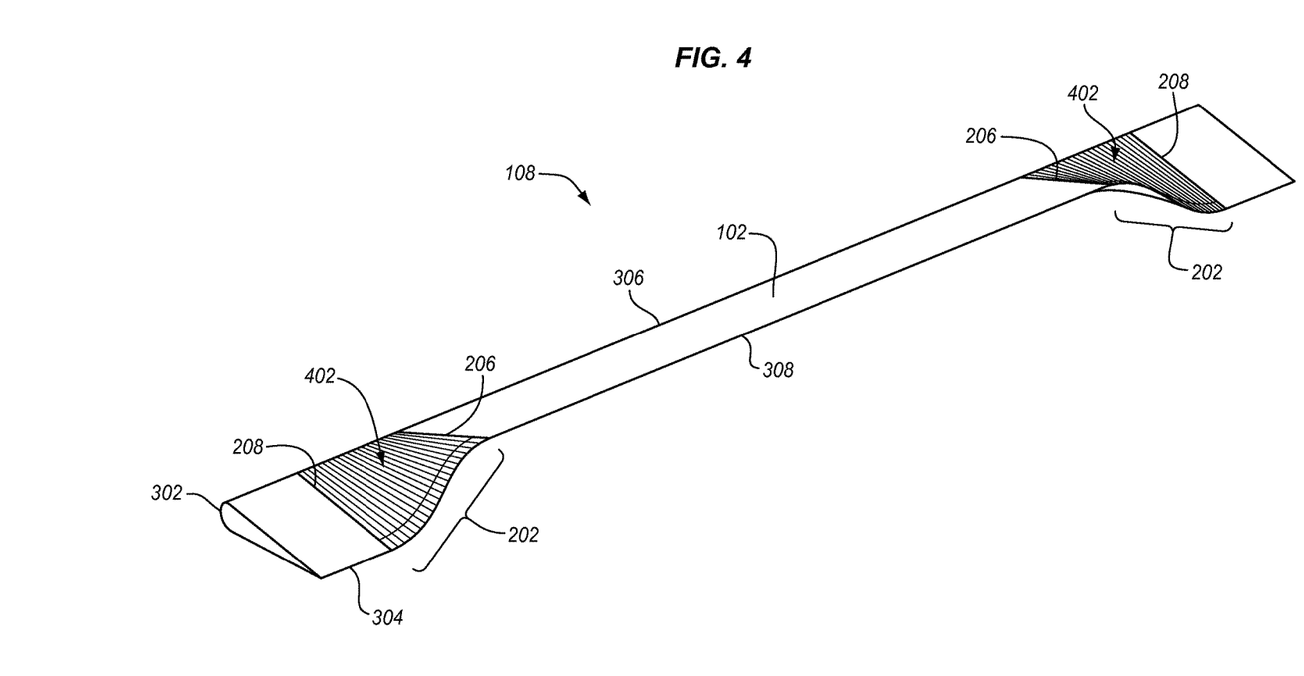
FIG. 4 illustrates a transitional element that is used to bridge a gap between an edge of a flight control surface and an edge of a non-movable portion of an airframe in an exemplary embodiment.

FIG. 4 illustrates a transitional element 402 that is used to bridge a gap between an edge of a flight control surface and an edge of a non-movable portion of an airframe in an exemplary embodiment. In this embodiment, transitional element 402 is generated by a plurality of thin ribs, which have a contour that is similar to aileron 102. If aileron 102 has a contour that differs from wing 108, then the ribs may be fabricated to vary in contour to allow for a transition from the contour of wing 108 to the contour of aileron 102 that may exist across gap 202.

In some embodiments, the ribs may be mounted on a member (e.g., a rod, not shown in this view) that spans gap 202. Edge 208 of wing 108 does not move, but edge 206 of aileron 102 does move. As aileron 102 moves, some of the ribs that make up transitional element 402 move along with aileron 102. In particular, ribs nearest edge 206 of aileron 102 move more than ribs nearest edge 208 of wing 108. For example, consider that aileron 102 moves to a position that establishes an angle (e.g., rotated angle 310 of FIG. 3) between aileron 102 and wing 108. A first rib nearest aileron 102 moves an effective angle with respect to wing 108 that is generally less than the angle established by aileron 102 with respect to wing 108. The next adjacent rib, or second rib, moves an effective angle that is generally less than the first rib. Each successive rib positioned away from aileron 102 moves an incrementally smaller angle. The angle difference between each successive rib is generally equal.

As the ribs deflect or move, the ribs form a surface that transitions from edge 206 of aileron 102 to edge 208 of wing 108, and acts to bridge gap 202. The transitional surface is a series of stepped distances between the moved, or rotated, ribs. The height of the steps, the smoothness, or the effective continuousness of the transitional surface is determined by the width of the ribs and the angle between each successive rib, to establish a stepped transitional surface. In some embodiments, the difference in angles between each rib may vary. In some embodiments, the ribs may have an equal width or different widths.

In some embodiments, the ribs are fixed to the member, and move in response to a twist or rotation of the member that varies along a length of the member. In other embodiments, the ribs rotate with respect to, or about, the member based on the movement of aileron 102. The ribs fill gap 202 and form a relatively smooth transitional surface from edge 206 of aileron 102 to edge 208 of wing 108. Transitional element 402 reduces the drag on wing 108, which improves the fuel efficiency of aircraft 100. Transitional element 402 may also reduce the acoustical noise generated by the gap 202. In some cases, transitional element 402 may also improve the performance of aileron 102 by reducing the turbulence generated by gap 202.

Figure 5:
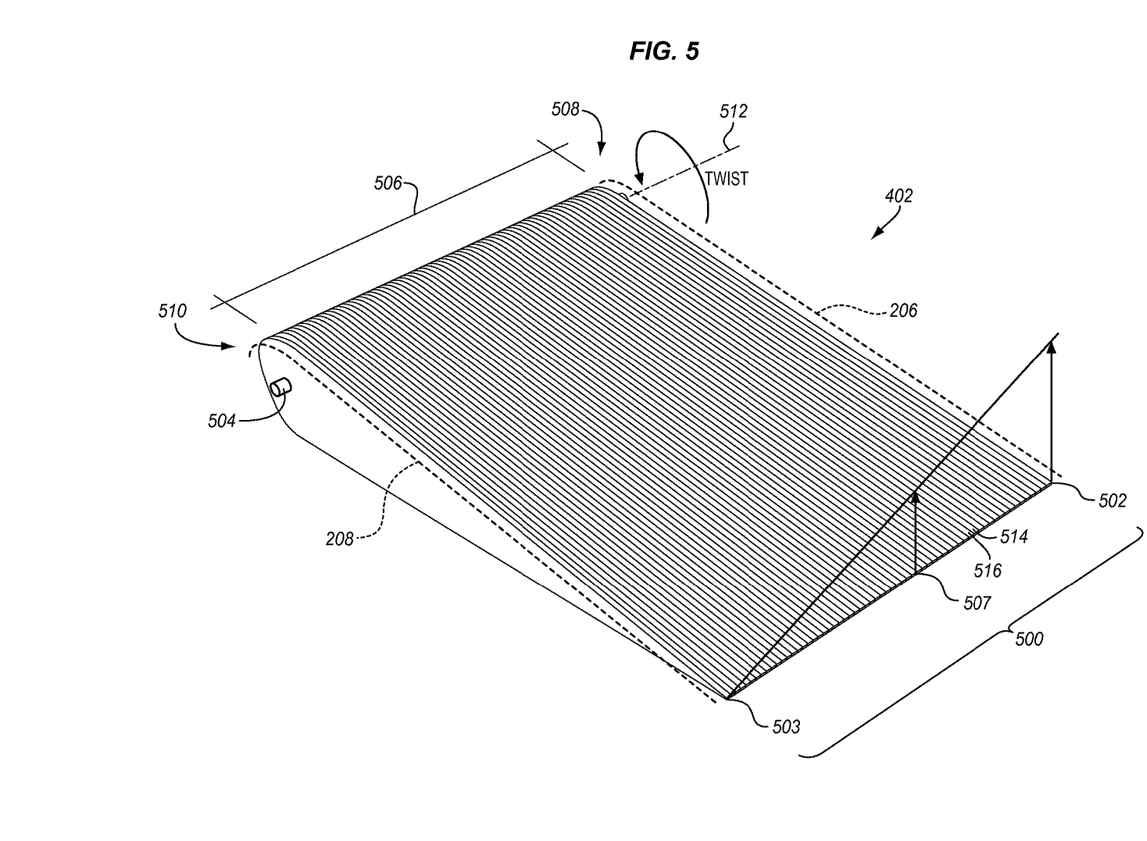
FIG. 5 illustrates a closer view of the transitional element of FIG. 4 in an exemplary embodiment.

FIG. 5 illustrates a closer view of transitional element 402 in an exemplary embodiment. In FIG. 5, ribs 500 are visible, as well as member 504. Member 504 may comprise any material that is able to twist or rotate across gap 202. Some examples of materials that may be utilized for member 504 include nitinol alloys, which are metal alloys of nickel and titanium. Other examples include composite materials. Member 504 is disposed across gap 202 along an axis 512 which extends from wing 108 to aileron 102.

A rib 502 illustrated in FIG. 5 is proximate to edge 206 of aileron 102, and a rib 503 is proximate to edge 208 of wing 108. In this embodiment, ribs 500 are fixed to member 504. As aileron 102 moves up (see FIG. 4), the amount of twist or rotation in member 504 varies along a length 506, with member 504 twisting or rotating more near edge 206 of aileron 102 at end 508 in contrast to end 510. The increased twist in member 504 moves rib 502 up more than rib 503. The ribs located between rib 502 and rib 503 will move a proportional amount. For instance, a rib 507 may move about half as much as rib 502, since rib 507 is about halfway between rib 502 and rib 503.

Figure 6:
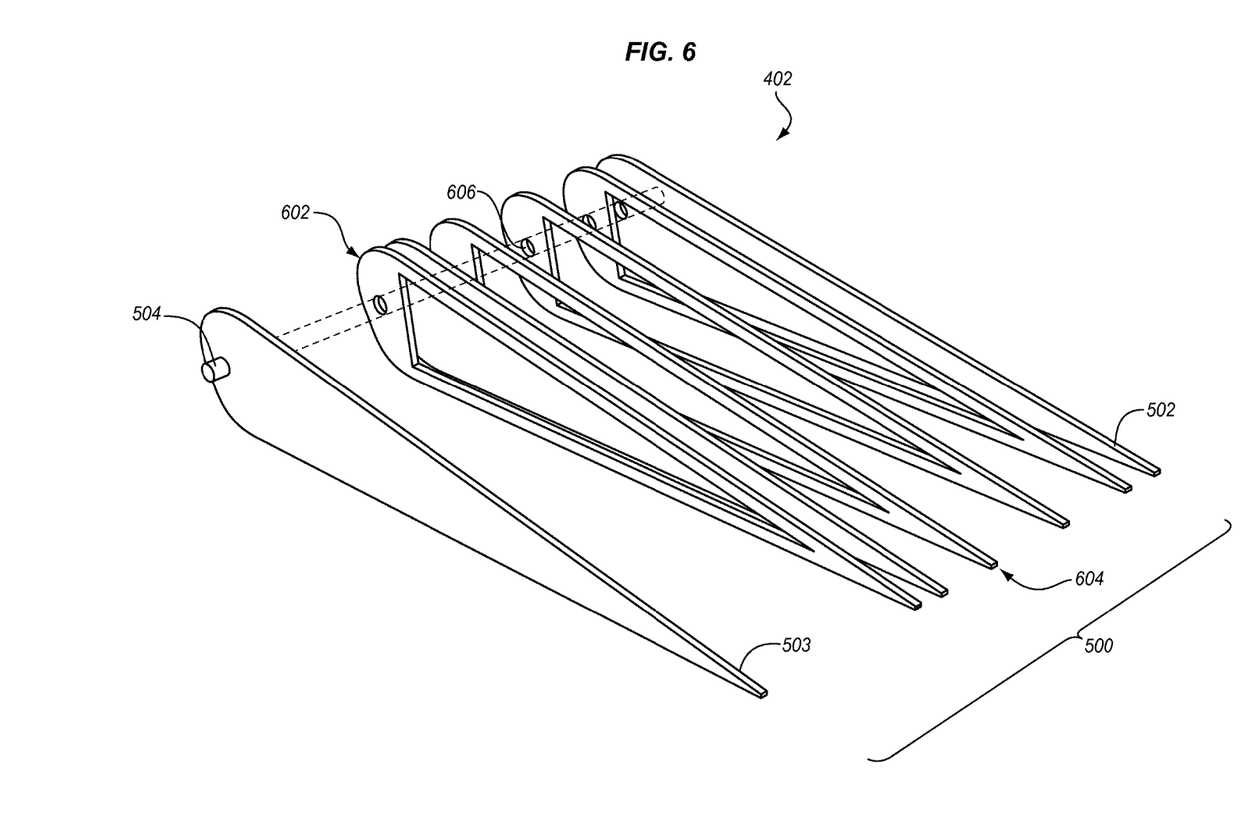
FIG. 6 illustrates the transitional element with some of the ribs removed in an exemplary embodiment.

FIG. 6 illustrates transitional element 402 with some of ribs 500 removed in an exemplary embodiment. In FIG. 6, it is easier to see that ribs 500 have a leading edge 602, which may correspond to leading edge 306 of aileron 102, and a trailing edge 604, which may correspond to trailing edge 308 of aileron 102. Also evident from FIG. 6 is that some of ribs 500 may be hollow. This may be desirable to reduce the weight of transitional element 402. Therefore, some of ribs 500 that form transitional element 402 may be hollow, solid, or some combination of both as desired. Also evident in FIG. 6 is that ribs 500 include holes 606, which allows member 504 to traverse across ribs 500. In this embodiment, ribs 500 are bonded or welded to member 504 along holes 606, such that ribs 500 only move as member 504 twists. In other embodiments, ribs 500 are not bonded or welded to member 504.

Figure 7:
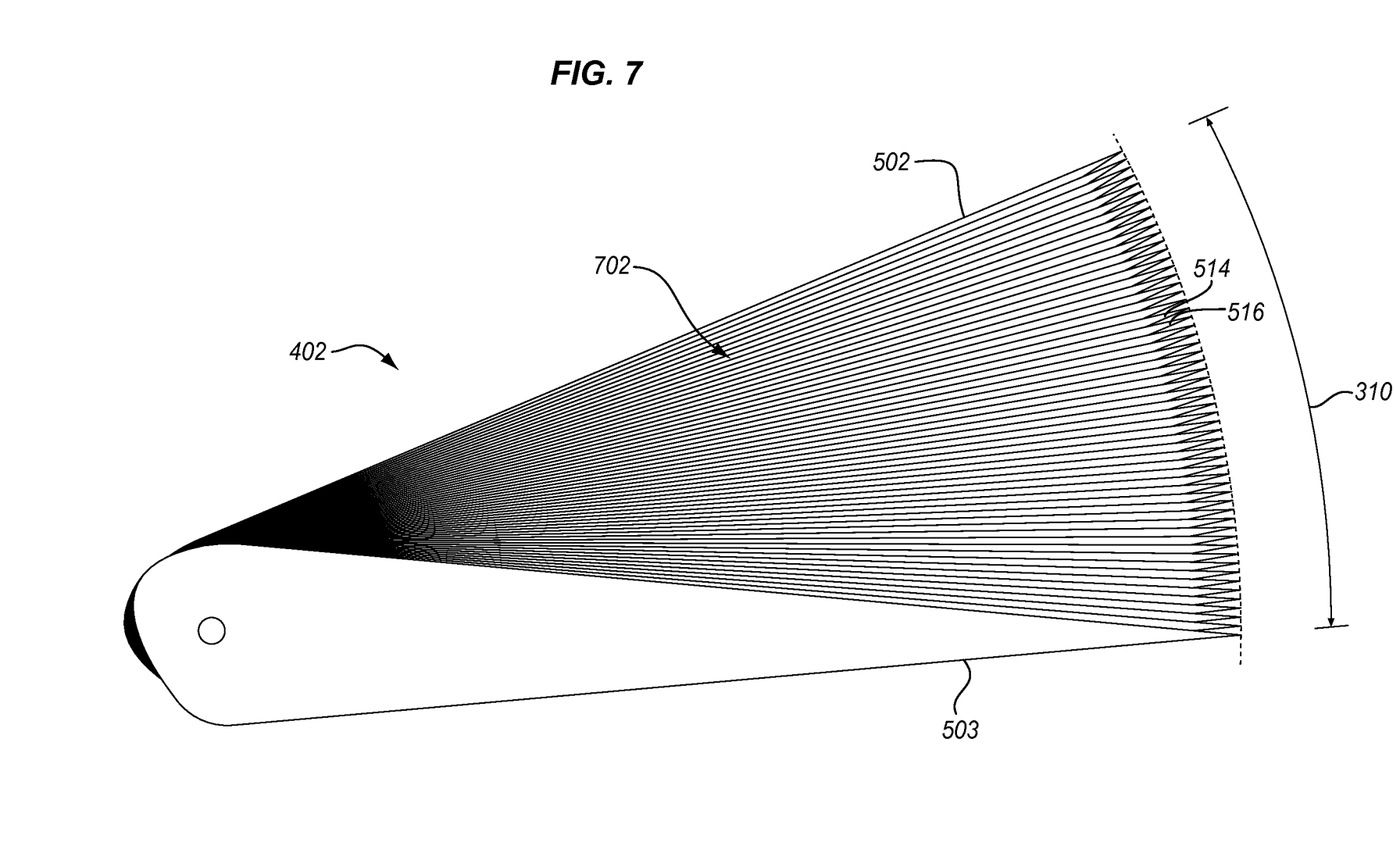
FIG. 7 illustrates a side view of the transitional element in an exemplary embodiment.

FIG. 7 illustrates a side view of transitional element 402 in an exemplary embodiment. As aileron 102 moves upward with respect to wing by rotated angle 310, each of ribs 500 moves or deflects by some portion of rotated angle 310. In this view, it is evident that rib 502 rotates more than rib 503, with the ribs located between rib 502 and rib 503 each rotating some portion of the total of rotated angle 310. Ribs 500 form a surface 702 that transitions in shape from aileron 102 back towards wing 108. Surface 702 is substantially smooth, and may have a smoothness that depends on a thickness of ribs 500.

Figure 8:
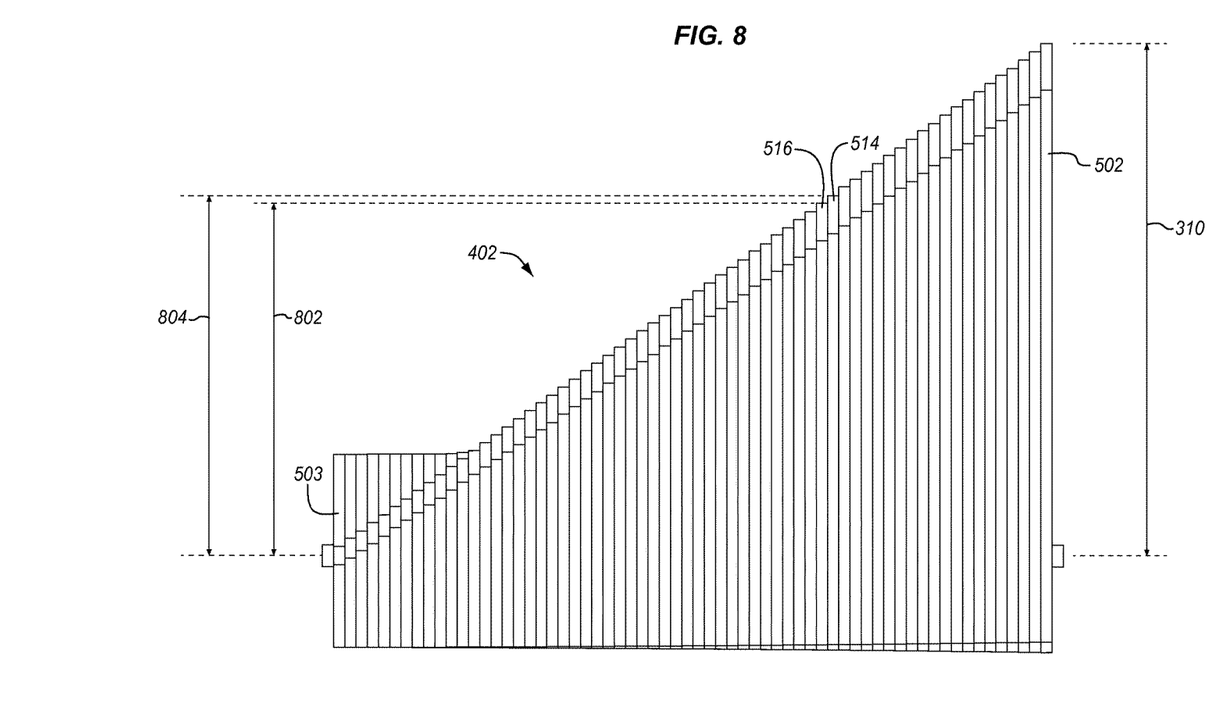
FIG. 8 illustrates the transitional element along a leading edge in an exemplary embodiment.

FIG. 8 illustrates transitional element 402 along trailing edge 604 in an exemplary embodiment. In this view, a stair-step pattern is visible in the surface formed by ribs 500, which is based on the thickness of ribs 500. Although fewer ribs 500 may be used to form transitional element 402, the ribs may be thicker, which would result in a rougher transitional surface across gap 202. However, there may be a limit to how thin ribs 500 may be, even though thinner ribs form a smoother transitional surface across gap 202.

Figure 9:
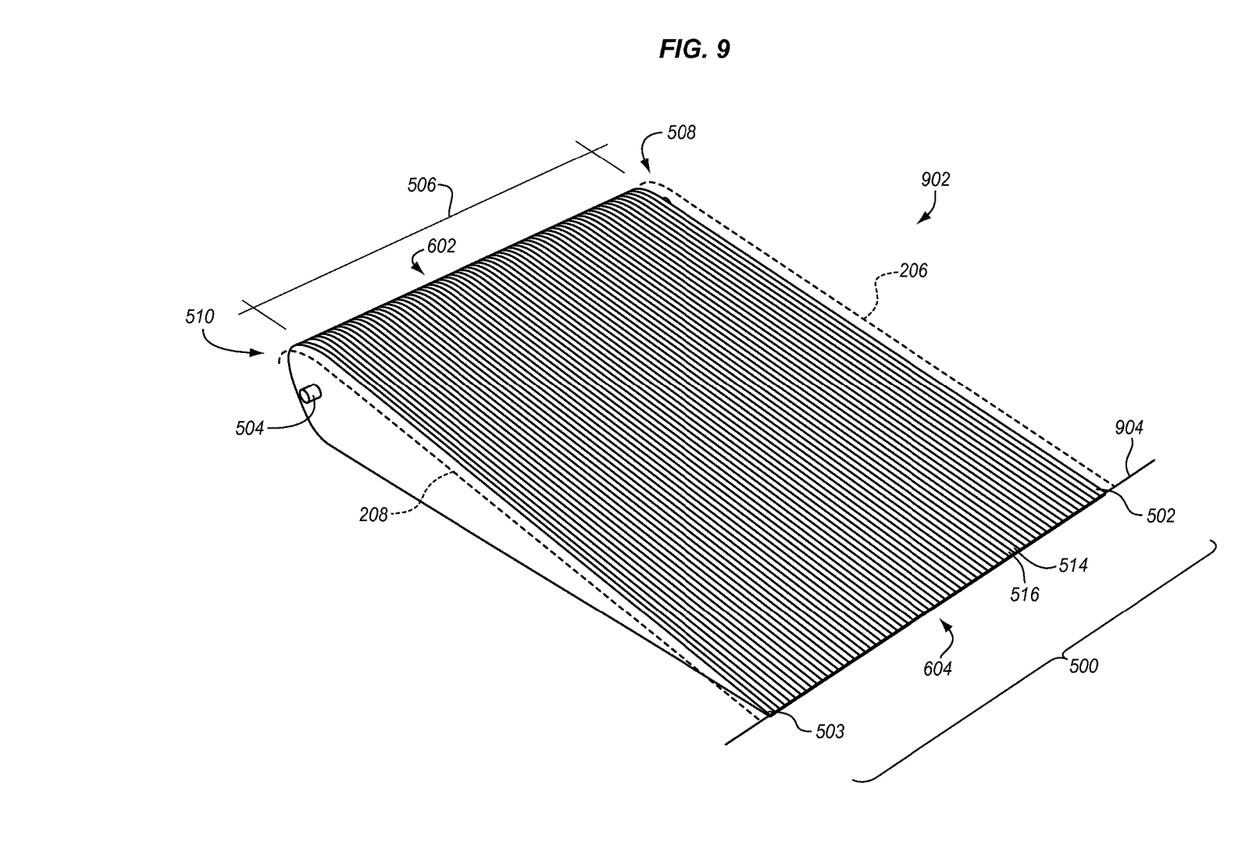
FIG. 9 illustrates another transitional element in an exemplary embodiment.

FIG. 9 illustrates another transitional element 902 in an exemplary embodiment. In this embodiment, ribs 500 are not fixed to member 504, but instead are able to pivot or rotate freely about member 504. A flexible element 904 is coupled to trailing edge 604 of ribs 500. Flexible element 904 is also coupled to trailing edge 308 of aileron 102 and to trailing edge 304 of wing 108. As aileron 102 moves up, flexible element 904 follows the movement of trailing edge 308 of aileron 102. This causes ribs 500 to move in a manner that has been described previously with respect to transitional element 402. In this embodiment, member 504 may not twist, since the twist of member 504 is not used to deflect ribs 500. Instead, member 504 may be rotatably mounted proximate to edge 208 of wing 108 and proximate to edge 206 of aileron 102.

Figure 10:
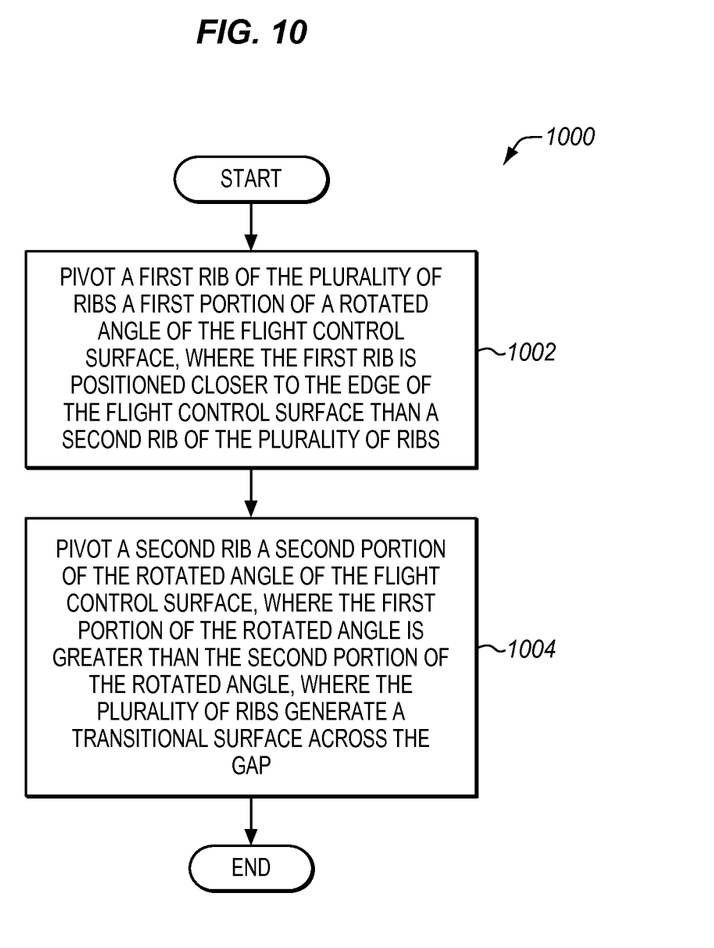
FIG. 10 is a flow chart of a method for actuating a transitional element in an exemplary embodiment.

FIG. 10 is a flow chart of a method 1000 of actuating a transitional element in an exemplary embodiment. Method 1000 will be discussed with respect to transitional element 402 and transitional element 902, although method 1000 may be performed by other transitional elements, not shown. The steps of the flow chart for method 1000 may include other steps that are not shown. Also, the steps of the flow chart for method 1000 may be performed in an alternate order.

For this embodiment, consider that aircraft 100 is in flight, and that aileron 102 is in a neutral position. A neutral position in this case refers to aileron 102 being aligned with the major surfaces of wing 108. For instance, aileron 102 is neither rotated up with respect to wing 108 or rotated down with respect to wing 108. This orientation of aileron 102 is illustrated in FIG. 2. In a neutral position, ribs 500 are not deflected or rotated with respect to each other. This is illustrated in FIG. 5 and FIG. 9. For instance, rib 514 (see FIG. 5), which is adjacent to rib 516, is in-line (e.g., not pivoted) with respect to rib 514.

To cause a change in the flight orientation of aircraft 100, aileron 102 may be rotated into a commanded position that is different than the neutral position. For example, a pilot of aircraft 100 may move aileron 102 in order to cause aircraft 100 to roll. To do so, aileron 102 is commanded to rotate out of the neutral position. One example of this orientation of aileron 102 is illustrated in FIG. 3. In a deflected or rotated position, ribs 500 pivot, with ribs closer to edge 206 of aileron 102 pivoting more than ribs located closer to edge 208 of wing 108.

As aileron 102 rotates, rib 514 (which is closer to edge 206 of aileron 102 than rib 516) pivots a portion of the rotated angle of aileron 102 (see step 1002). Rib 516 also pivots a portion of the rotated angle of aileron 102, however, rib 516 pivots less than rib 514, since rib 512 is closer to edge 206 than rib 514 (see step 1004). The difference in how ribs 512-514 pivot is illustrated in FIG. 8. If rotated angle 310 is the total rotation of aileron 102, then it is apparent from FIG. 8 that rib 514 pivots more than rib 514, since a deflection 804 of rib 514 is larger than a deflection 802 of rib 516. This occurs because rib 514 is closer to edge 206 of aileron 102 than rib 516. Each successive rib between rib 516 and edge 208 of wing 108 deflects or pivots less. The result is that each successive rib towards edge 208 of wing 108 rotates a smaller portion of rotated angle 310 of aileron 102.

Although the previous discussions of transitional element 402 and transitional element 902 have been describe with respect to a particular flight control surface (i.e., aileron 102), transitional element 402 and/or transitional element 902 may be utilized on any flight control surface that moves relative to a fixed portion of an airframe of an aircraft. Some example surfaces include flight control surfaces 103-107 illustrated in FIG. 1, although other surfaces, not shown or described previously, may be enhanced utilizing transitional element 402 and/or transitional element 902 to mitigate the discontinuous surfaces generated as the surfaces move.

Utilizing transitional element 402 and/or transitional element 902 to bridge gaps that arise between flight control surfaces 102-107 and the non-movable portions of the airframe of aircraft 100, the discontinuous surfaces generated by the gaps are reduced or eliminated, resulting in a smoother transitional surface across the gaps. This reduces the turbulence generated by gaps, providing a number of benefits previously described.

Although specific embodiments were described herein, the scope is not limited to those specific embodiments. Rather, the scope is defined by the following claims and any equivalents thereof.

The invention claimed is:

1. An apparatus, comprising:
a transitional element that is configured to bridge a gap between an edge of a flight control surface and an edge of a non-movable portion of an airframe, the transitional element including:
a member that spans the gap and has a first end fixed proximate to the edge of the flight control surface and a second end fixed proximate to the edge of the non-movable portion of the airframe, wherein the member defines an axis extending from the edge of the flight control surface to the edge of the non-movable portion of the airframe; and
a plurality of ribs that span the gap to form a stepped transitional surface across the gap, wherein each of the plurality of ribs is fixed to the member along a length of the member, wherein each of the plurality of ribs has a contour that corresponds to the flight control surface and is configured to pivot about the axis of the member a portion of a rotated angle of the flight control surface to generate the stepped transitional surface across the gap, wherein the stepped transitional surface is exposed to airflow.

2. The apparatus of claim 1 wherein:
a twist of the member varies along the length of the member in response to the rotated angle of the flight control surface; and
each of the plurality of ribs is configured to pivot the portion of the rotated angle of the flight control surface in response to the twist in the member to generate the stepped transitional surface across the gap.

3. The apparatus of claim 1 wherein:
the member is coupled proximate to the edge of the flight control surface along an axis of rotation of the flight control surface.

4. The apparatus of claim 1 wherein:
the plurality of ribs comprises a first rib and a second rib adjacent to the first rib, the first rib positioned closer to the edge of the flight control surface than the second rib;
the first rib pivots a first portion of the rotated angle of the flight control surface;
the second rib pivots a second portion of the rotated angle of the flight control surface; and
the first portion is greater than the second portion.

5. The apparatus of claim 1 wherein:
the stepped transitional surface does not include an overlay.

6. The apparatus of claim 1 wherein:
the rotated angle of the flight control surface is generated based on a movement of the flight control surface from a first position to a second position;
the first position a neutral position; and
the second position is a commanded position that is different than the first position.

7. The apparatus of claim 1 wherein:
at least one of the plurality of ribs is hollow.

8. The apparatus of claim 1 wherein:
the plurality of ribs includes a leading edge that is aligned with a leading edge of the flight control surface.

9. The apparatus of claim 1 wherein:
the plurality of ribs includes a trailing edge that is aligned with a trailing edge of the flight control surface.

10. The apparatus of claim 1 wherein:
the flight control surface comprises at least one of an aileron, an elevator, and a rudder.

11. A method of bridging a gap between an edge of a flight control surface and an edge of a non-movable portion of an airframe with a transitional element, the transitional element including a member that spans the gap and has a first end fixed proximate to the edge of the flight control surface and a second end fixed proximate to the edge of the non-movable portion of the airframe, wherein the member defines an axis extending from the edge of the flight control surface to the edge of the non-movable portion of the airframe, wherein the transitional element further includes a plurality of ribs that span the gap to form a stepped transitional surface across the gap, wherein each of the plurality of ribs is fixed to the member along a length of the member, wherein each of the plurality of ribs has a contour that corresponds to the flight control surface and are configured to pivot about the axis of the member a portion of a rotated angle of the flight control surface, the method comprising:
pivoting a first rib of the plurality of ribs to a first portion of the rotated angle, wherein the first rib is positioned closer to the edge of the flight control surface than a second rib of the plurality of ribs; and
pivoting the second rib to a second portion of the rotated angle,
wherein the first portion of the rotated angle is greater than the second portion of the rotated angle,
wherein the plurality of ribs generates a stepped transitional surface across the gap that is exposed to airflow.

12. The method of claim 11 further comprising:
pivoting a third rib of the plurality of ribs to a third portion of the rotated angle of the flight control surface, wherein the third rib is positioned farther from the edge of the flight control surface than the second rib, wherein the second portion of the rotated angle is greater than the third portion of the rotated angle.

13. The method of claim 11 further comprising:
establishing a stepped transitional surface across the gap that does not include an overlay.

14. The method of claim 11 wherein:
the flight control surface comprises at least one of an aileron, an elevator, and a rudder.

15. An apparatus, comprising:
a transitional element that bridges a gap between an edge of a flight control surface and an edge of a non-movable portion of an airframe, the transitional element including:
a member that spans the gap and defines an axis extending from the edge of the flight control surface to the edge of the non-movable portion of the airframe; and
a plurality of ribs disposed in a row along the member that span the gap to form a stepped transitional surface across the gap, wherein each of the plurality of ribs is fixed to the member along a length of the member, wherein each of the plurality of ribs has a contour that corresponds to the flight control surface and are configured to pivot about the axis of the member a portion of a rotated angle of the flight control surface, wherein the stepped transitional surface is exposed to airflow;
a means for twisting the member along the axis to pivot a first rib of the plurality of ribs to a first portion of the rotated angle, wherein the first rib is positioned closer to the edge of the flight control surface than a second rib of the plurality of ribs; and a means for twisting the member along the axis to pivot the second rib to a second portion of the rotated angle, wherein the first portion of the rotated angle is greater than the second portion of the rotated angle.

16. The apparatus of claim 15 further comprising:

a means for twisting the member along the axis to pivot a third rib of the plurality of ribs to a third portion of the rotated angle, wherein the third rib is positioned farther from the edge of the flight control surface than the second rib, wherein the second portion of the rotated angle is greater than the third portion of the rotated angle.

17. The apparatus of claim 15 wherein:

the flight control surface comprises at least one of an aileron, an elevator, and a rudder.

18. The apparatus of claim 15, wherein:

the stepped transitional surface does not include an overlay.

\* \* \* \* \*